UNITED STATES PATENT OFFICE.

THEOPHILUS KLOSS, OF MANKATO, MINNESOTA.

CEREAL COFFEE.

1,377,838.      Specification of Letters Patent.      Patented May 10, 1921.

No Drawing.      Application filed October 2, 1920. Serial No. 414,167.

*To all whom it may concern:*

Be it known that I, THEOPHILUS KLOSS, a citizen of the United States, residing at Mankato, in the county of Blue Earth and State of Minnesota, have invented new and useful Improvements in Cereal Coffee, of which the following is a specification.

The present invention relates to a cereal coffee substitute and to a process of making the same.

Heretofore many proposals have been made to produce coffee substitutes from cereal products, in most cases bran, middlings or the like, having been used as the cereal material, and these do not contain any very large proportion of the nutrient value of the cereal. In the present invention whole grain is preferably used, this being preferably wheat, rye, and hulless barley, although to some extent other cereals can be used.

The process will be described with particular reference to the use of wheat, rye and hulless barley, or preferably a mixture of the three, but it is to be understood that the other cereals can be employed in an analogous manner.

The grain is first cleaned by the use of the same or substantially the same machinery as is used in cleaning wheat which is to be made into flour. The cleaned grain, preferably after drying, is then crushed, in the raw state, by being passed through or between rollers or steel burs. During this crushing operation it is preferable to so crush up the material that about 90% of same will be able to pass through a sieve having 8 meshes per linear inch.

The crushed grain is then mixed with sweetened boiling water in such proportions that every particle of the crushed grain will be in a moist state. This does not mean that a large excess of liquid is added, such as would form a dough. About 2 gallons of liquid is added for each 100 lbs. of grain used. The particles should be in a moist, as distinguished from a wet state. The sugar solution or syrup preferably employed may be produced by dissolving about 6 pounds of sugar in each gallon of water. White granulated sugar may be used, or relatively pure brown sugar, or maple sugar. To a certain extent, also, extracted honey can be used. The crushed grain is preferably agitated while being mixed with the small quantity of boiling solution of sugar, this producing better results than a cold liquid. The stated proportions will produce a warm mixture (but not a mixture having a temperature near the boiling point).

The mixture is then put into a vat and pressed into a cake, which cake is allowed to stand for about 24 to 48 hours, the time depending upon the weather conditions; in cold weather a longer time is required than in hot weather. The material is then taken from the vat and pulverized or crushed to the form of a powder or meal. It is advisable to crush the material to such an extent that about 90% of same will pass through a sieve having 8 meshes per linear inch.

The material in the form of a powder is then thoroughly dried, this being performed preferably by a slow drying operation. As in all slow drying processes, a low temperature is used. This step aids materially in developing the desired coffee-like flavor and aroma, and all the strength or nutriment of the grain and sugar material is retained in the material.

The dry product is now roasted, until it has the desired brown color resembling roasted coffee. In this operation the material is heated while being still agitated, until the temperature of the material itself reaches about 250° C. The material, after cooling more or less, is then ready to be placed into boxes, for example, two-pound pasteboard or tin boxes which will then be ready for labeling and shipment.

It is called to attention that in carrying out the process of my present application I do not at any time cook or boil the grain with water or other liquids, which operation would detract materially from the nutritious properties of the product and would also detract from the flavor. It is advisable also to add a little salt, say about an ounce to eight pounds of the grain, this preferably being added before the mixture containing the crushed grain and sugar solution is put into the vat. This may be added just after the crushed grain is mixed with the solution of sugary material.

I claim:

1. A process of making a coffee substitute which comprises crushing clean whole grain, moistening but not saturating the crushed grain with a solution containing sugar, pressing the moistened mass into a cake, allowing the cake to stand for 24 to 48 hours, disintegrating the cake to a powder, drying the powder and roasting the product to a coffee-brown color.

2. A process of making a coffee substitute which comprises crushing clean whole wheat, rye or barley, moistening but not saturating the crushed wheat with a solution containing sugar, pressing the moistened mass into a cake, allowing the cake to stand for 24 to 48 hours, disintegrating the cake to a powder, drying the powder and roasting the product to a coffee-brown color.

In testimony whereof I affix my signature.

THEOPHILUS KLOSS.